(12) United States Patent
Hiemenz et al.

(10) Patent No.: US 10,470,949 B2
(45) Date of Patent: Nov. 12, 2019

(54) VEHICLE EXTRACTION DEVICE

(71) Applicants: Gregory Hiemenz, Silver Spring, MD (US); Pablo Sztein, Silver Spring, MD (US)

(72) Inventors: Gregory Hiemenz, Silver Spring, MD (US); Pablo Sztein, Silver Spring, MD (US)

(73) Assignee: InnoVital LLC, Calverton, MD (US)

( * ) Notice: Subject to any disclaimer, the term of this patent is extended or adjusted under 35 U.S.C. 154(b) by 287 days.

(21) Appl. No.: 15/592,660

(22) Filed: May 11, 2017

(65) Prior Publication Data

US 2017/0326007 A1    Nov. 16, 2017

Related U.S. Application Data

(60) Provisional application No. 62/334,564, filed on May 11, 2016.

(51) Int. Cl.

| | |
|---|---|
| *A61G 1/01* | (2006.01) |
| *A61G 1/013* | (2006.01) |
| *A61G 1/044* | (2006.01) |
| *B60N 2/60* | (2006.01) |
| *A61G 7/10* | (2006.01) |

(52) U.S. Cl.
CPC .............. *A61G 1/01* (2013.01); *A61G 1/013* (2013.01); *A61G 1/044* (2013.01); *A61G 7/1051* (2013.01); *B60N 2/60* (2013.01); *A61G 7/1023* (2013.01)

(58) Field of Classification Search
CPC .......... A61G 1/00; A61G 1/01; A61G 1/013; A61G 1/04; A61G 1/044; A61G 1/048; A61G 7/1021; A61G 7/1023; A61G 7/1025; A61G 7/1026; A61G 7/1028; A61G 7/103; A61G 7/1051; A61G 1/013; A61F 5/37; A61F 5/3707; A61F 5/3769; A61F 5/3776; A61F 5/058; A61F 5/05816; A61F 5/05883

USPC ............... 5/625–629, 81.1 R, 706, 710–713; 128/869, 870, 846

See application file for complete search history.

(56) References Cited

U.S. PATENT DOCUMENTS

| 2,309,464 A | * | 1/1943 | Lucci et al. ............. | A61G 1/01 |
| | | | | 5/236.1 |
| 2,489,828 A | * | 11/1949 | Springer ................... | A61G 1/01 |
| | | | | 5/625 |

(Continued)

*Primary Examiner* — Robert G Santos
(74) *Attorney, Agent, or Firm* — Royal W. Craig; Gordon Feinblatt LLC

(57) ABSTRACT

A softgoods seat covering convertible into vehicle extraction device for immobilizing a patient while still seated in the seat of a vehicle, and for safe extraction and transport thereafter. The device uses a plurality of inflatable panels enclosed within a woven cover and connected together by inflation tubing to an inflator for simultaneous or sequential inflation. In normal, pre-blast operations, the durable, uninflated device simply acts as the outer fabric of the seat back and seat cushion, with deployable structures folded/tucked behind the seat back and under the seat pan. Upon arrival of the medic, sections of the device are sequentially deployed through inflation and secured around the patient by wraparound straps to immobilize the patient in the sitting position, and to facilitate extraction and removal in a supine position. The device is intended to mitigate injuries/casualties caused by exposure to landmine or IED blasts.

26 Claims, 5 Drawing Sheets

(56) References Cited

U.S. PATENT DOCUMENTS

| | | | | |
|---|---|---|---|---|
| 3,158,875 | A * | 12/1964 | Fletcher | A61G 1/01 5/627 |
| 4,211,218 | A * | 7/1980 | Kendrick | A61F 5/05883 128/870 |
| 4,589,407 | A * | 5/1986 | Koledin | A61F 5/05883 128/869 |
| 4,607,655 | A * | 8/1986 | Wagner | E04H 15/20 135/116 |
| 4,776,327 | A * | 10/1988 | Russell | A61F 5/05883 128/875 |
| 4,979,520 | A * | 12/1990 | Boone, Jr. | A61G 1/01 128/870 |
| 5,058,575 | A * | 10/1991 | Anderson | A61F 5/05883 128/875 |
| 5,060,324 | A * | 10/1991 | Marinberg | A61B 6/0442 128/873 |
| 7,708,019 | B2 * | 5/2010 | Kendrick | A61F 5/05883 128/846 |
| 7,962,983 | B2 * | 6/2011 | Keesaer | A61G 1/01 5/627 |
| 8,782,833 | B2 * | 7/2014 | Beurguet | A61G 1/01 128/870 |
| 9,861,539 | B1 * | 1/2018 | Stickler | A61G 1/013 |
| 2007/0287943 | A1 * | 12/2007 | Kendrick | A61F 5/05883 602/19 |
| 2010/0199434 | A1 * | 8/2010 | Keesaer | A61G 1/01 5/628 |
| 2012/0291203 | A1 * | 11/2012 | Beurguet | A61G 1/01 5/706 |
| 2017/0326007 | A1 * | 11/2017 | Hiemenz | A61G 7/1051 |
| 2018/0271302 | A1 * | 9/2018 | Volla | A47C 27/081 |

* cited by examiner

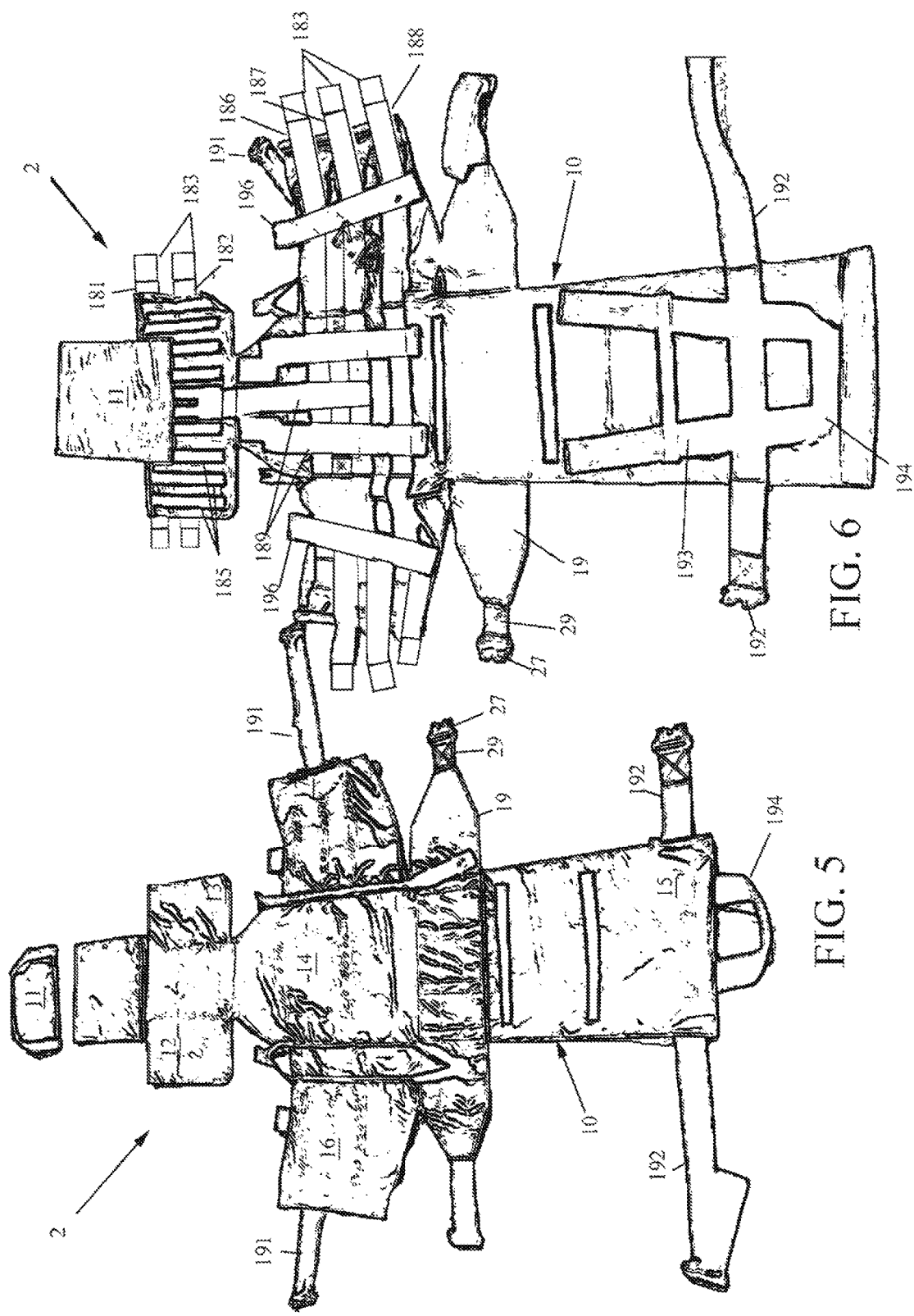

VEHICLE EXTRACTION DEVICE

CROSS-REFERENCE TO RELATED APPLICATIONS

The present application derives priority from U.S. Provisional Patent Application 62/334,564 filed 11 May 2016.

BACKGROUND OF THE INVENTION

1. Field of the Invention

The present invention relates to emergency rescue tools and, more particularly to a device for extracting injured occupants from a vehicle.

2. Description of the Background

In recent military conflicts, protection against vehicle underbody blasts has been a key survivability issue. Underbody blasts from buried mines and Improvised Explosive Devices (IEDs) have resulted in significant casualties. Modern military vehicle hulls are typically designed to deflect the blast wave to minimize vertical loading of the vehicle and to reduce risk of hull rupture, thereby reducing occupant exposure to blast overpressure, shrapnel, fire, and gases. However, even assuming that hull integrity is maintained, significant and often injurious accelerative loading to the vehicle occupant is likely. Severe lower leg injuries commonly result from rapid acceleration and local deformation of the vehicle floor. Similarly, pelvic and lower spine injuries often occur as a result of potentially both local and global accelerative loading through the seat. Finally, head and neck injuries can also occur as a result of accelerative loading as well as impact on nearby interior structures (roof, walls, equipment, etc.), A variety of occupant protection devices have been, or are in the process of being, developed, such as energy absorbing flooring, blast attenuating seats, as well as head/neck protection systems. However, significant injury risk still remains throughout these events. Not only is there risk of failure of one of these occupant protection devices due to misuse or extreme hull/wall deflections, but there is also substantial risk of an overmatch scenario where the blast loading exceeds the design capability of the protection devices. Moreover, even in the perfect scenario when these protection devices limit loading to within design levels, there is still typically a 10-20% risk of injury associated with these acceptable injury tolerance levels. As such, in seating and vehicle design, it is important to consider how an injured occupant can be rapidly treated and evacuated post-event.

Once the area is secured, a combat medic's first priority would be to address injuries involving the "ABCs" fairway, breathing, and circulation) to the extent possible within the vehicle. However, beyond perhaps applying tourniquets to extremities, most emergency interventions would likely need to be administered post vehicle extraction. As such, rapid stabilization and extraction of the patient is critical. Given the high potential for catastrophic lower leg, pelvic, and spinal fractures, patient stabilization is particularly important to reduce pain and ensure secondary injuries such as spinal cord injury, disruption of vasculature, and conversion of closed to open (compound) fracture does not occur during extraction. Given the limited space within the vehicle, what is needed is a system by which the patient can be stabilized in the seat and extracted in the seated position.

It would be greatly advantageous to provide a vehicle extraction device for stabilizing and immobilizing a patient while still seated in the seat of a vehicle, then for extracting that patient in the seated position, and transporting immobilized in a supine position, thereby reducing the risk of secondary injuries throughout the process.

SUMMARY OF THE INVENTION

It is, therefore, an object of the present invention to provide a vehicle extraction device for stabilizing and immobilizing a patient still seated in the seat of a vehicle, and for extracting that patient in the seated position, thereby reducing the risk of secondary injuries.

It is another object to provide a vehicle extraction device that serves as a seat cover when not deployed, and which deploys for mitigation of injuries/casualties caused by exposure to severe vehicular events such as crashes, rollovers, or blast events by facilitating rapid stabilization of the head, neck, spine, chest, pelvis, and extremities according to current best practices for vehicle extraction.

It is another object to provide a vehicle extraction device that affords simple tool-less deployment and detachment from the heavy/bulky seat frame.

It is another object to provide a vehicle extraction device that with fabric detachment points that will not hind like metallic/rigid detachment mechanisms under heavy hull/wall deformations.

It is another object to provide a vehicle extraction device that can be dragged for ease of patient extraction and allows simplified maneuverability through narrow and uneven vehicle egress paths during extraction.

It is still another object to provide a vehicle extraction device that can engage existing litter racks in military ambulatory vehicles.

It is another object to provide a vehicle extraction device that is entirely fabric or plastic and is X-ray transparent and MRI compatible, facilitating care.

According to the present invention, the above-described and other objects are accomplished by a vehicle extraction device for immobilizing a patient while still seated in the seat of a vehicle, comprising a plurality of inflatable panels connected together by inflation tubing and simultaneously deployable from a flimsy to a substantially rigid yet resilient support structure. The inflatable panels are integrated with or contained within a cover having a hood for insertion over the vehicle headrest. In a preferred embodiment the cover is integrated with the inflatable panels, e.g., the inflatable panels are vinyl plastic or robber sheet members laminated together to a Nylon or cotton fabric exo-cover, respectively. The laminated construction is air impervious and forms rugged seals that do not tear or rip apart in use. Alternatively, one skilled in the art will recognize that the cover may be a separate component that drapes down the seat, and including pocket sections for containing the various inflatable panels. The cover is removably attached to the seat by fasteners such as book-and-loop, snaps, buckles, or the like, and when uninflated the entire device acts as a seat cover. The cover also includes a plurality of lateral wraparound straps each having a distal slide buckle for attachment to itself. In addition, an inflation mechanism for inflation of the panels to their substantially rigid position is provided, after which the wraparound straps compress the panels around the patient to immobilize the patient while still seated in the seat of the vehicle. The inflation mechanism is preferably an auto-inflation mechanism such as a CO2 cartridge inflator with simple manual release (pull tab, etc.), but one skilled in the art will readily understand that the inflation mechanism may alternatively be a pump (manual or electric), gas generator (sodium azide), or simply an oral inflation port. Once the patient is immobilized, the device can be detached from the seat and the patient extracted. The patient can be immobilized and extracted in a seated position and converted to a supine position for evacuation purposes without removal of the device. In normal, pre-blast operations, the durable, uninflated device simply acts as the outer fabric of the seat back and seat cushion, with deployable structures folded/tucked behind the seat back and under the seat pan. Upon arrival of the medic, sections of the device are sequentially deployed through inflation. Once the patient is stabilized in the sitting position, the inflated device 2 is simply detached (via snaps, etc.) from the seat frame for extraction. The combination of deployable inflatable panels, and wraparound straps provides support and secures the patient through the process, saving lives.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 5 is a front view of the cover for the multi-piece inflatable bladder used in the vehicle extraction device of FIGS. 1-4.

FIG. 6 is a back view of the cover of FIG. 5.

DETAILED DESCRIPTION OF THE PREFERRED EMBODIMENT

Figure 1:
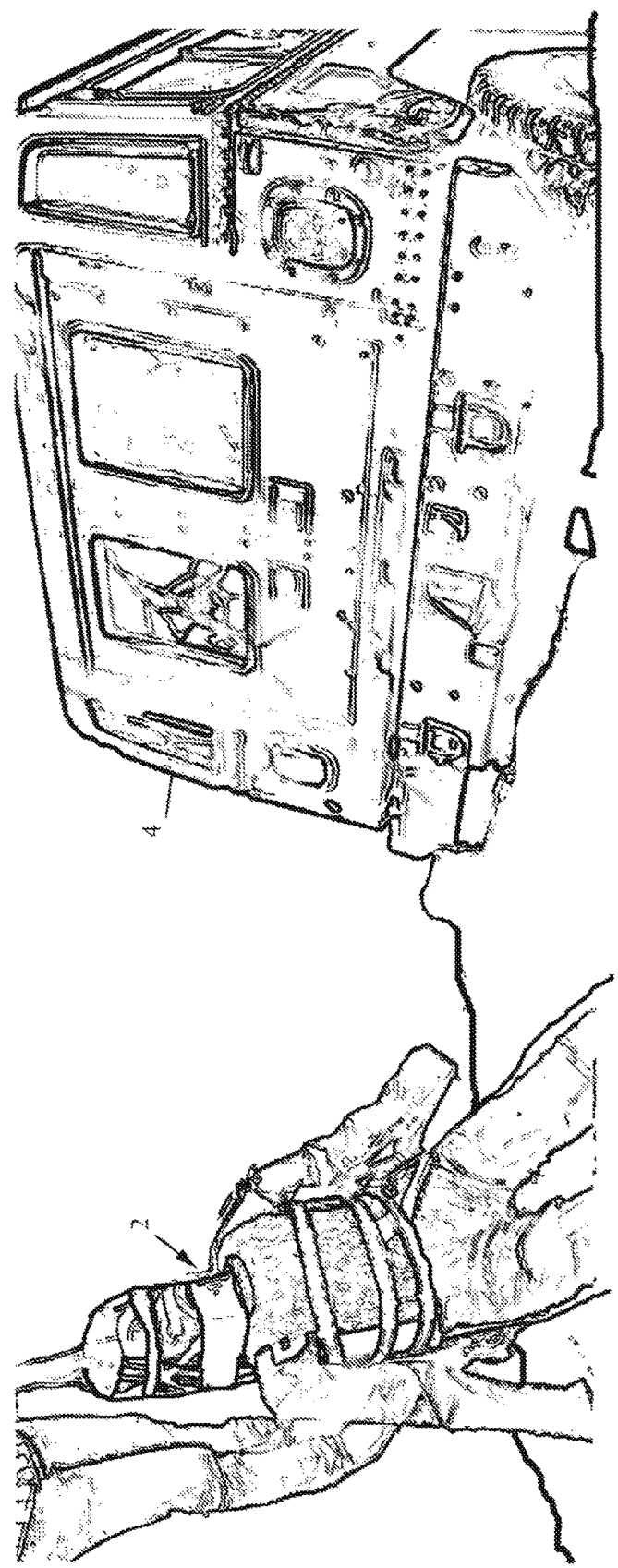
FIG. 1 is a perspective view of the vehicle extraction device according to an embodiment of the invention in use during extraction of a patient from the seat of a vehicle and conversion to a stretcher.

The present invention is a vehicle extraction device 2 for stabilizing a patient still seated in the seat of a vehicle 4, and for extracting that patient in the seated position, thereby reducing the risk of secondary injuries. The vehicle extraction device 2 uses deployable support structures, e.g., stiff inflatable structures that inflate to provide support and secure the patient. Prior to deployment the extraction device integrates with the existing seat structure of the vehicle, but easily separates from the seat during use so that the seat (including frame, linear rails, energy absorber mechanism, etc.) can be left behind as illustrated in FIG. 1. Thus in normal, pre-blast/crash operations, the uninflated vehicle extraction device simply acts as the outer fabric of the seat back and seat cushion, with deployable structures folded/tucked behind the seat back and under the seat pan. Upon arrival of a medic or fellow soldier, sections of the device are sequentially deployed through inflation. Then after the patient has been stabilized in the sitting position within the vehicle, the semi-rigid inflated structure is simply detached from the seat frame for extraction. There is no metallic or otherwise rigid detachment mechanism that can bind or be rendered useless after significant hull/wall deformation. Simple fabric detachment points tolerate such deformations and remain functional. Moreover, the device facilitates extraction by significantly reducing weight, and the puncture-resistant inflatable bladder described below absorbs shocks and is far more forgiving for carrying or dragging the patient through rocky and uneven egress paths as per FIG. 1. Finally, after extraction, the device 2 may be convened to a stretcher/litter with the patient in a flat, supine position, and may engage existing titter racks such that further patient manipulation is minimized.

Figure 2:
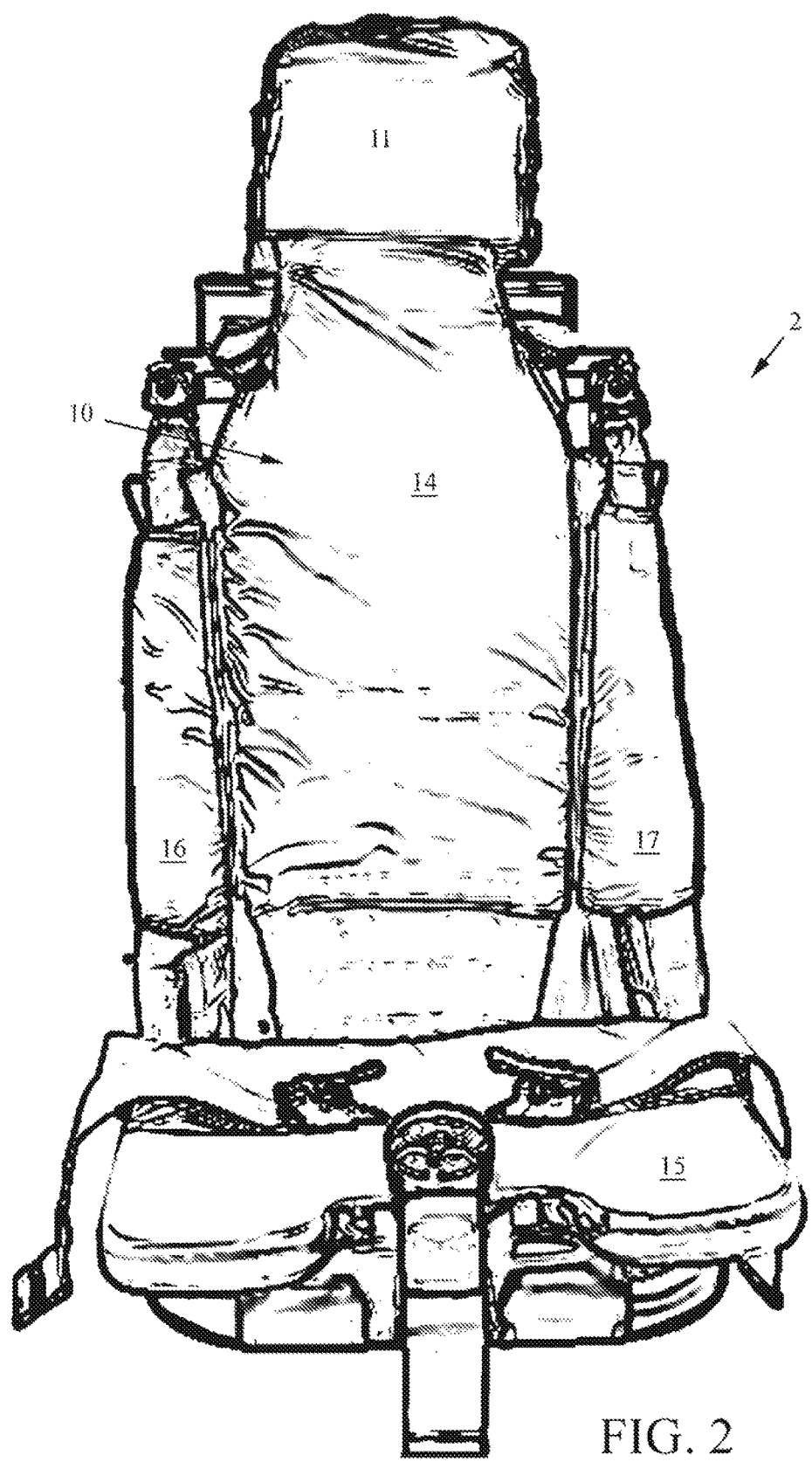
FIG. 2 is a perspective view of the vehicle extraction device of FIG. 1 integrated with the seat of the vehicle.
Figure 3:
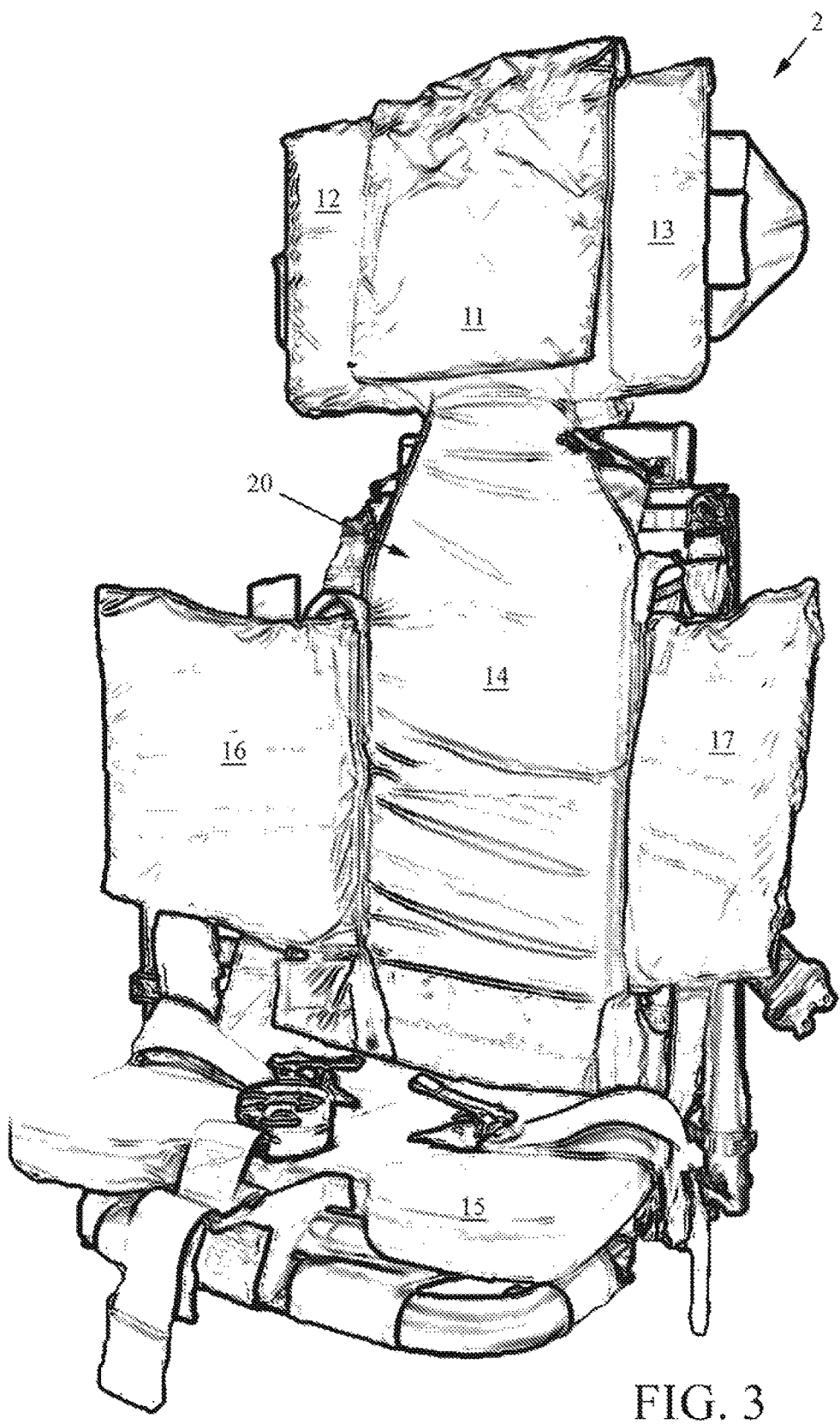
FIG. 3 is a perspective view of the vehicle extraction device of FIG. 2 deployed on the seat of the vehicle.

As seen in FIGS. 2-3, the vehicle extraction device 2 generally comprises a cover 10 conforming to an internal stabilizer 20 (obscured), the cover being sectionalized to include left and right head flaps 12, 13 upwardly flanking an upper section 14. The upper section 14 extends down along the seat back to the seat rest. When not inflated the left and right flaps 12, 13 may be wrapped around back of the seat headrest and covered by an integral headrest shroud 11 as seen in FIG. 2. In addition, a lower section 15 extends downwardly from the upper section 14, and opposing lower flaps 16, 17 downwardly flank the upper section 14. When not inflated the lower section 15 may be wrapped underneath the seat rest as seen in FIG. 2. In an embodiment, the upper section 14 generally corresponds to the head, neck and torso, while the lower section 15 generally corresponds to the upper legs, pelvis, and all or part of the lower legs plus optionally the ankles and feet. The left and right upper flaps 12, 13 cradle the head, while the opposing lower flaps 16, 17 cradle the torso. In a preferred embodiment the cover 10 is integrated with the inflatable panels described below, for example, the cover 10 comprises a Nylon or cotton fabric exo-cover laminated to plastic or rubber inner inflatable panels. A laminated construction minimizes weight and cost. However, one skilled in the art will recognize that the cover 10 may be a separate component.

Figure 4:
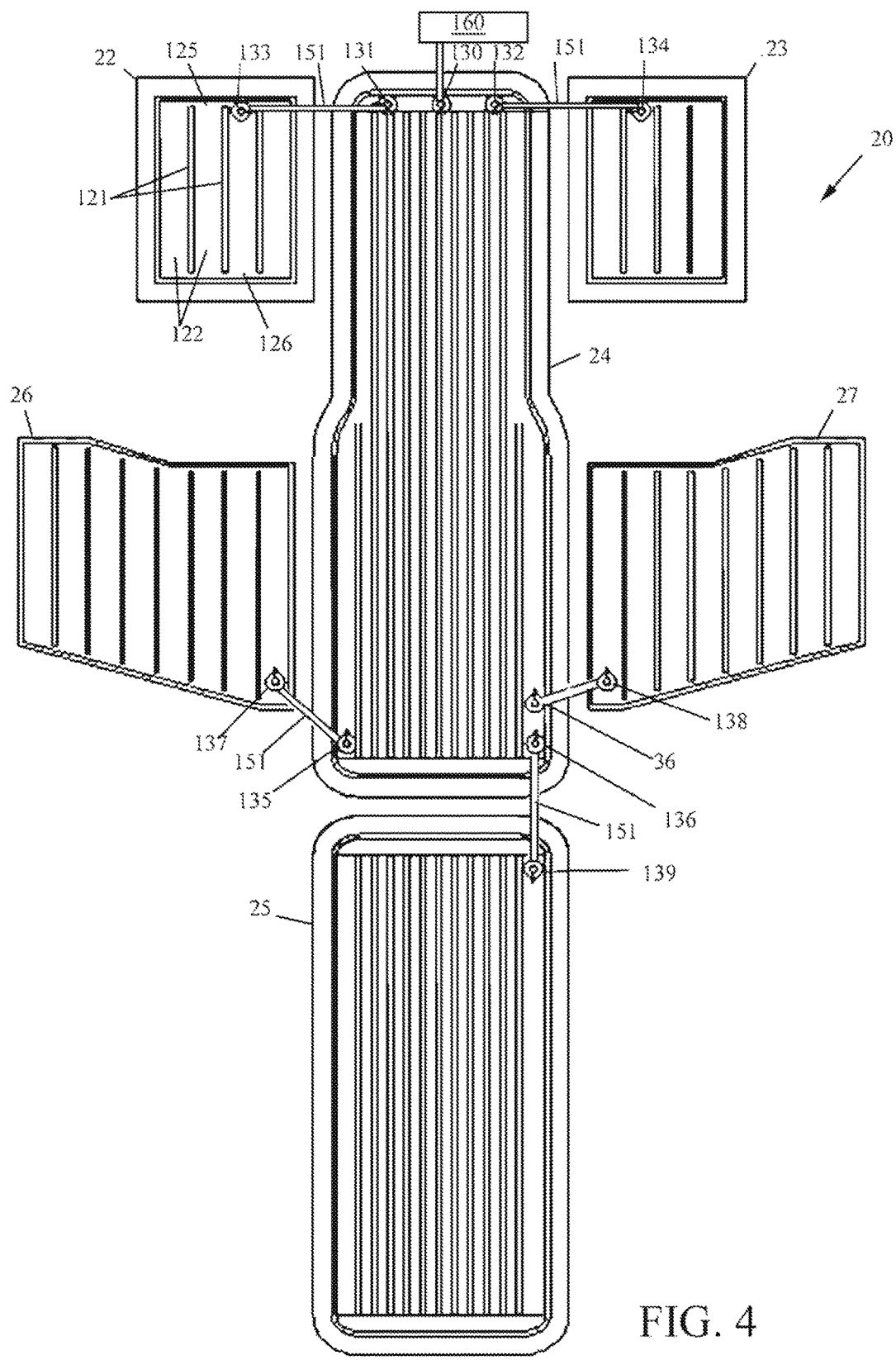
FIG. 4 is a front view of the multi-piece inflatable bladder used in the vehicle extraction device of FIGS. 1-3.

As seen in FIG. 4, corresponding sections of the internal stabilizer 20 include upper left and right stabilizers 22, 23 upwardly flanking an upper stabilizer 24, a lower stabilizer 25 extending downwardly from the upper stabilizer 24, and opposing lower stabilizers 26, 27 downwardly flanking the upper stabilizer 24. Just as with the cover 10 (seen in FIG. 2), the upper stabilizer 24 generally corresponds to the head, neck and torso, while the lower stabilizer 25 generally corresponds to the upper legs, pelvis, and all or part of the lower leas plus optionally the ankles and feet. The left and right upper stabilizers 22, 23 cradle the head, while the opposing lower stabilizers 26, 27 cradle the torso.

Each section of the internal stabilizer 20 generally includes a discrete inflatable member formed of two layers of vinyl, rubber or Hypalon™ sheet welded together peripherally, and (as explained relative to the left stabilizer 22 of FIG. 4) along longitudinal channels 121 to form a plurality of parallel cells 122, similar to a traditional air mattress. The cells 122 are in fluid communication at top and bottom manifolds 125, 126 for rapid high-pressure inflation within a range of from 4-10 psi. The cells 122 are longitudinally oriented, herein meaning substantially parallel to patient's spine, and are placed laterally adjacent to one another, meaning substantially orthogonal to longitudinal. The cells 122 are each deployable from a flimsy to a substantially rigid structure. Cells 122 collectively provide rigidity to resist bending about lateral axes, yet remain interstitially flexible along channels 121 to allow each stabilizer panel to be wrapped around the patient for immobilization. The upper stabilizer 24 is equipped with five fluid-flow ports including one inflation port 130 and four equalization ports 131, 132, 135, and 136. The inflation port 130 is connected by tubing 151 to an inflation mechanism 160 which is preferably a $CO_2$ cartridge-inflator with manual release. However, one skilled in the art will readily understand that the inflation mechanism 160 may alternatively be a pump (manual or electric), gas generator (sodium azide or compressed, nitrogen or argon, gas inflator with a pyrotechnic trigger identical to automotive airbag inflators), or simply a one-way oral inflation port. Two upper equalization ports 131, 132 located on opposite sides of the inflation port 130 are connected by tubing 151 each coupled to the inflation ports 133, 134 of left and right head stabilizers 22, 23, respectively. Two lower equalization ports 135, 136 are each coupled by tubing 151 to the inflation ports 137, 138 of opposing torso stabilizers 26, 27. The remaining equalization ports 138 is coupled by tubing 151 to the inflation port 139 of the lower leg, ankle and foot stabilizer 25. The foregoing inflation system facilitates rapid inflation and deployment of the system 2 in case of emergency. Any or all of the foregoing ports 130-139 may incorporate one-way valves to prevent inadvertent total deflation in case of puncture, and any or all of the foregoing ports 130-139 may incorporate manual on-off valves to allow a medic to sequentially inflate the stabilizers.

As seen in FIG. 5 (front view) and FIG. 6 (rear view), the cover 10 comprises a durable fabric shell integrally laminated to the internal stabilizer 20, or formed separately of fabric, e.g., 500 denier Cordura® fabric, and compartmentalized with pocket sections to hold the six internal stabilizer 20 sections. In either case the cover 10 is preferably jointed at intermediate seams between the stabilizers. Specifically, the cover 10 is sectionalized to include left and right upper flaps 12, 13 upwardly flanking an upper section 14, a lower section 15 extending downwardly from the upper section 14, and opposing lower flaps 16, 17 downwardly flanking the upper section 14. An optional padded pelvic belt 19 may be provided without stabilization inserts. In addition, as seen in FIG. 6 the rear of cover 10 includes an integral webbing system of straps suitable for multi-purpose use in fastening the device 2 to the seat, sequential immobilization of the patient, and fastening the device 2 to a stretcher. When attached to the seat, left and right upper flaps 12, 13 fold around back of the head rest and an upper flap 21 drapes overtop the headrest. The cover 10 includes a separate head rest shroud 11 that slips over the folded flaps 12, 13, 21 and the seat headrest to maintain the device 2 folded. The left and right upper flaps 12, 13 enclose the respective left and right upper stabilizers 22, 23 and uninflated these wrap around the back of the seat and may attach onto themselves by mating hook-and-loop pads. Similarly, the left and right lower flaps 16, 17 enclose the left and right lower stabilizers 26, 27 and these may wrap around the back of the seat and attach onto themselves by mating hook-and-loop fasteners. The lower flap 15 encloses the lower stabilizer 25 and this wraps frontally down and around the seat, attaching underneath by mating hook-and-loop pads, snaps, or other suitable fasteners. For sequential immobilization of the patient a plurality of wraparound straps are provided for wrapping around the patient, compressing the foregoing stabilizers there against, and immobilizing the patient. The wraparound straps are attached to the cover 10 by a grid-array of reinforcing straps sewn or otherwise attached permanently to the cover 10. Specifically, two wraparound straps 181, 182 fully encircle the left and right flaps 12, 13 and are designed to surround the patient's head (or helmet), and are preferably attachable or cinchable by one hand for fast single-handed immobilization of the head. Toward this end the wraparound straps 181, 182 may be elasticized and may be attached onto themselves by plastic slide-buckles 183 to immobilize the patient's head in the respective left and right stabilizers 22, 23. The wraparound straps 181, 182 are secured to a plurality of parallel reinforcing strips 185 sewn or attached across the rear of the left and right flaps 12, 13 and upper section 14. Strips 185 may be resilient plastic stays inserted in pockets or sewn directly, hard fabric strips, or the like, and these prevent tilting of the neck and head when wraparound straps 181, 182 are secured. In addition, three wraparound straps 186-188 fully encircle the left and right lower flaps 16, 17 and may be attached onto themselves by plastic slide-buckles 183 to immobilize the, patient's upper torso in a sitting position within the respective left and right torso stabilizers 26, 27. The wraparound straps 186-188 are secured to a pattern of reinforcing webbing 189 sewn across the rear of the left and right lower flaps 16, 17 and lower section 14 for secure compression and immobilization. The pelvic belt 19 includes a wraparound strap 29 with distal slide buckle 27 for attachment around back of the seat. Finally, one wraparound strap 191 folly encircles the lower section 15 and may be attached onto itself by plastic slide-buckle 183 to immobilize the patient's upper and/or lower legs, pelvic area, and optionally ankles/feet within the respective lower stabilizer 25. This wraparound strap 191 is secured to a pattern of reinforcing strips 193 sewn across the rear of the lower flap 15 for secure compression and immobilization. In addition to the foregoing securement features at least one handle 194 is provided for dragging the patient. For transportation the device may be secured to a poled-litter (or stretcher), as indeed straps on poled litters are often missing. Fabric loops 196 are provided as needed for attachment of the device 2 to a poled litter (stretcher).

In use from the vehicle seat, the system 2 facilitates rapid deployment and inflation as needed through the various stages of emergency treatment. This begins with immobilization of a patient in a seated position while inside the vehicle. The shroud 11 is removed from the seat headrest inflator 160 manually actuated, upper left and right flaps 12, 13 are unfolded and upper left and right stabilizers 22, 23 inflated, and wraparound straps 181, 182 fastened about the patient's head. Similarly, lower left and right flaps 16, 17 are unfolded, left and right lower stabilizers 26, 27 are deployed, and wraparound straps 186-188 secured. In addition, two opposing arm straps 191 connect to corresponding seat straps 192 for securing the device 2 in an inclined seated position. These straps 191, 192 are tightened to maintain the, seated position before extraction. These same straps 191, 192 can be disconnected to move to a supine position and later used around the legs and arms. At this point the patient is immobilized in a seated position. Next, for extraction the torso/leg straps 186-188, 191, 192 keep the patient in a seated position and handle 194 may be used to lift and drag out of the vehicle.

Finally, for transport and evacuation the device 2 straps 191, 192 are disconnected and the patient can be readily lowered to a supine position and secured to a pull-out poleless litter (as above) via loops 196 to move or airlift the patient. The straps 191, 192, which maintain the patient in a sitting position during extraction, are unclipped and adjusted to their new use as arm and lower leg control straps when a supine position is desirable.

The device 2 works exceptionally well at preventing secondary injuries when extracting a patient from a vehicle following a blast and/or crash event by facilitating rapid stabilization of the head, neck, spine, chest, pelvis, and extremities. It affords simple (no tools) deployment and detachment from the heavy/bulky seat frame, and its fabric detachment points will not bind like metallic/rigid detachment mechanisms under heavy hull/wall deformations. The device allows simplified, maneuverability through narrow and uneven vehicle egress paths during extraction, and rapid conversion to flat/supine litter once out of the vehicle. Moreover, the litter can engage existing litter racks in military ambulatory vehicles. The device 2 is entirely fabric or plastic and is X-ray transparent and MRI compatible, facilitating care.

Having now set forth the preferred embodiments and certain modifications of the concepts underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A softgoods seat covering convertible into a vehicle extraction device, comprising:
   a plurality of panels each having a series of longitudinally oriented members placed laterally adjacent to one another, each said member being deployable from a flimsy to a substantially rigid structure; and
   an actuator for deploying said plurality of panels from said flimsy to said substantially rigid structure, whereby when said actuator deploys said members to said substantially rigid structure, said panels are substantially rigid in bending about lateral axes, but remain flexible along longitudinal axes to allow the panels to be wrapped around a patient for immobilization.

2. The softgoods seat covering according to claim 1, wherein said plurality of panels comprise woven fabric laminated to an elastomer.

3. The softgoods seat covering according to claim 1, wherein said woven fabric comprises strands.

4. The softgoods seat covering according to claim 1, wherein, said plurality of panels are each inflatable.

5. The softgoods seat covering according to claim 4, wherein said plurality of panels are operatively connected to each other for inflation.

6. The softgoods seat covering according to claim 5, wherein one of said plurality of panels is operatively connected to said actuator for inflation.

7. The softgoods seat covering according to claim 6, wherein said actuator includes a manual trigger.

8. The softgoods seat covering according to claim 6, wherein said actuator includes an automatic trigger.

9. The softgoods seat covering according to claim 6, wherein said actuator is a manual inflator.

10. The softgoods seat covering according to claim 7, wherein said actuator is a compressed gas inflator.

11. The softgoods seat covering according to claim 4, wherein each of said plurality of inflatable panels comprises a plurality of parallel elongate cells separated by welded seams and a manifold connecting said cells.

12. The softgoods seat covering according to claim 4, wherein each of said plurality of inflatable panels comprises at least one gas inlet valve.

13. The softgoods seat covering according to claim 12, wherein one of said plurality of inflatable panels comprises a plurality of gas outlet valves.

14. The softgoods seat covering according to claim 1, configured to be releasably coupled to a seat structure to enable removal from the seat.

15. The softgoods seat covering according to claim 1, wherein said plurality of panels comprises a main head-and-torso panel for positioning down said patient's back, and left and right head panels flanking said main panel for immobilizing the patient's head and neck.

16. The softgoods seat covering according to claim 15, further comprising a plurality of wraparound straps, which includes at least two wraparound straps encircling said head-and-torso panel and left and right head panels and attached to said covering.

17. The softgoods seat covering according to claim 16, wherein said plurality of panels comprises left and right torso panels flanking said main panel for immobilizing the patient's torso.

18. The softgoods seat covering according to claim 17, wherein said plurality of wraparound straps includes at least three wraparound straps encircling said head-and-torso panel and left and right torso panels and attached to said covering.

19. The softgoods seat covering according to claim 16, wherein said plurality of panels comprises a leg panel for immobilizing the patient's legs.

20. The softgoods seat covering according to claim 19, wherein said plurality of wraparound straps includes at least one wraparound strap encircling said leg panel and attached to said covering.

21. The softgoods seat covering according to claim 20, wherein said covering comprises reinforcement webbing sewn thereto and to said at least one wraparound strap.

22. The softgoods seat covering according to claim 1, wherein said covering comprises at least one handle sewn thereto for dragging said patient.

23. The softgoods seat covering according to claim 1, further comprising a plurality of wraparound straps attaching from a torso panel to a leg panel of said plurality of panels to maintain the occupant in a seated position during extraction.

24. The softgoods seat covering according to claim 23, wherein said plurality of wraparound straps attaching from said torso panel to said leg panel are releasable to enable conversion to a supine position.

25. The softgoods seat covering according to claim 1, wherein inflation of the plurality of panels enables immobilization of said patient in a supine position.

26. The softgoods seat covering according to claim 1 further configured for carrying the patient.

* * * * *